Patented July 13, 1943

2,324,067

UNITED STATES PATENT OFFICE 2,324,067

PURIFICATION OF HYDROCARBON OILS

Gerald C. Connolly, Baton Rouge, La., assignor to Standard Oil Development Company, a corporation of Delaware No Drawing. Application August 3, 1940,
Serial No. 351,249

3 Claims. (Cl. 196—28)

This invention relates to the purification of hydrocarbons and pertains more particularly to catalysts for the desulfurization of hydrocarbons.

The object of the present invention is to provide an improved desulfurizing catalyst for hydrocarbons, either in the gaseous or liquid state.

Other objects and advantages of the invention will be apparent from the detailed description hereinafter.

I have found that alumina which has been subjected to "peptizing" treatment as hereinafter described forms a highly effective catalyst for removing sulfur impurities from hydrocarbons. Hydrocarbons subjected to desulfurizing treatment in accordance with this invention may be either the liquid or gaseous hydrocarbons.

The alumina which is subjected to the peptizing treatment in accordance with the present invention may comprise any of the commercial grades of alumina, such as purified bauxite, activated alumina, various aluminum hydrates, and the like. For best results, however, it is preferred to employ as a starting material a gelatinous precipitate of alumina which may be formed, for example, by reacting an aluminum salt with a basic solution, such as ammonium hydroxide.

In accordance with the present invention, the various types of alumina above described are peptized by treatment with an organic acid, such as acetic, formic, trichloracetic acids, and the like. During this treatment, a part or all of the alumina may be converted into an alumina hydrosol which upon setting coagulates into an alumina hydrogel. While desirable it is not essential to prolong the treatment to such a point as to convert all of the alumina into the hydrosol.

The peptizing treatment with the organic acid may be accomplished at room temperature or at slightly elevated temperature and the concentration of the acid solution may vary over an extended range. In most cases, however, it is preferred to employ a relatively dilute solution, such as from 4 to 20%. The treatment is preferably accomplished in a mixing device such as a ball mill, or the like.

Another particularly effective method for producing peptized alumina having a high order of activity for desulfurizing hydrocarbon oils is by treating metallic aluminum, such as aluminum foil, aluminum flakes, or other finely-divided aluminum, directly with the organic acid. According to this method, an alumina hydrosol forms directly which subsequently coagulates into the hydrogel. This reaction can be accelerated by the use of a small amount of mercurous oxide as a catalyst.

It has also been found that the activity of the alumina can be improved by incorporating therein vanadium oxide in amounts ranging from 2 to 20%. In cases where the vanadium oxide is employed, it is not essential to subject the alumina to the peptizing treatment. For example, a particularly effective catalyst can be obtained by incorporating vanadium oxide in dry alumina gel.

To illustrate the advantages of the invention, the following examples are submitted, it being understood that the values and conditions given therein are illustrative rather than limitive.

In each of the examples given, the desulfurizing activity of the catalyst referred to therein was determined under the following test conditions. A Venezuelan heavy cracked naphtha known as "Aruba splitter-bottoms" having a sulfur content of 0.275% was passed over the catalyst at a rate of 1 volume of liquid oil per volume of catalyst per hour over a six-hour period. The tests were run at 800° F. and at 900° F. Samples were taken at the end of the first, fourth and sixth hours and the sulfur analysis of the sample was determined. The sulfur in Aruba splitter-bottoms is of a particularly resistant type in that it can only be partly removed at best by standard refining practices.

Example 1

For comparative purposes, a commercial grade of bauxite having its origin in the state of Alabama was first tested under the above conditions. The results of this test are shown in the table hereinafter.

Example 2

Peptized alumina was formed according to the following procedure. About equal volumes of a 10% solution of aluminum sulfate and a 1.2% normal solution of ammonium hydroxide were combined. A gelatinous precipitate formed which was first filtered and then washed substantially free of soluble reaction products. This precipitate without being dried was placed in a ball mill and treated with a 4 to 16% solution of acetic acid. The relative proportions of the precipitate and acetic acid solution was about 1 liter of acid to 6 kilograms of the precipitate. This product was subjected to treatment for a period of one hour. This product was then dried at a temperature of about 212° F. The dried particles were then slowly heated to about 900° F. to 1000° F. and held at that temperature until all of the acetic acid had been driven off. The resulting product was then molded into pellets and tested according to the procedure above outlined. The results of this test are set forth in the table hereinafter.

*Example 3*

Dry powdered alumina gel which had been previously activated at a temperature of 1000° F. was wetted with an ammonium vanadate solution of a concentration sufficient to deposit about 3% of vanadium oxide on the gel. This product was tested as previously described and the results of this test are shown in the accompanying table:

| Ex. | Catalyst | Sulfur analysis | | | | | |
|---|---|---|---|---|---|---|---|
| | | Run I—800° F. | | | Run II—900° F. | | |
| | | 1 hr. | 4 hrs. | 6 hrs. | 1 hr. | 4 hrs. | 6 hrs. |
| 1 | Bauxite | 0.208 | 0.218 | 0.22 | 0.177 | 0.197 | 0.219 |
| 2 | "Peptized" alumina gel | 0.164 | 0.144 | 0.170 | 0.076 | 0.131 | 0.103 |
| 3 | Alumina gel +3% $V_2O_5$ | | | | 0.106 | 0.136 | 0.171 |

From the above table it will be noted that the products forming the present invention are much more effective for desulfurizing hydrocarbon oils than bauxite which is generally recognized to be a good desulfurizing catalyst.

Having described the preferred embodiment of the invention, it will be understood that it embraces other variations and modifications within the spirit and scope thereof.

I claim:

1. A method of removing sulfur from hydrocarbons which comprises passing the sulfur-containing hydrocarbons in contact with a catalyst comprising alumina gel and vanadium oxide, said alumina gel being formed by treating gelatinous alumina with an organic acid and maintaining said oil in contact with the catalyst for a period and at a temperature sufficient to remove a substantial amount of sulfur therefrom.

2. An improved method for the desulfurization of hydrocarbon oils of the type of heavy naphthas which comprises contacting said oil at a temperature between 800 and 900° F. with a catalyst comprising a peptized alumina gel, and maintaining the oil in contact with said catalyst for a time sufficient to effect the removal of a substantial proportion of the sulfur from the oil.

3. An improved method for desulfurizing hydrocarbon oils of the type of cracked naphthas which comprises contacting the oil with a catalyst comprising a major proportion of peptized alumina gel and a minor proportion of vanadium oxide at a temperature between 800 and 900° F. for a time sufficient to effect the removal of a substantial proportion of the sulfur from the oil.

GERALD C. CONNOLLY.